Patented Jan. 12, 1954

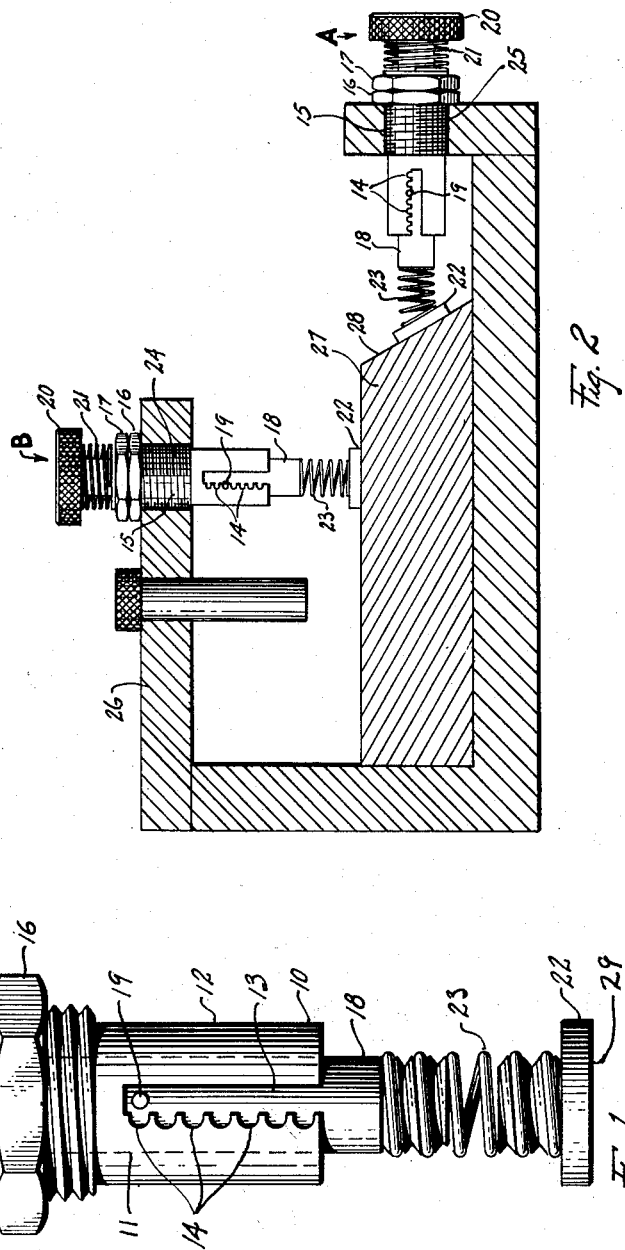

2,665,598

UNITED STATES PATENT OFFICE 2,665,598

QUICK ACTION CLAMP

Raymond W. Hardy, Chula Vista, Calif., assignor to Rohr Aircraft Corporation, Chula Vista, Calif., a corporation of California Application January 11, 1952, Serial No. 265,996

4 Claims. (Cl. 77—62)

This invention relates to a clamp for holding a part, or series of parts, in a jig or fixture while a light machining or assembly operation takes place. It has as its primary object the provision of a quickly actuated clamp which may be inexpensively manufactured and readily installed in a jig or fixture and which may be easily removed from them is desired for re-use in another jig.

In many instances, as for example, while drilling a small hole in a part, a clamping pressure sufficient only to hold the part in its proper position in the jig or fixture is all that is required. The same is true when a number of parts are placed in an assembly jig preparatory to fastening them together as a unit. Frequently a screw type clamp, or equally cumbersome means, is used for holding these parts with the result that a great deal of time is used in clamping and releasing the parts during the operation.

Accordingly one of the objects of this invention is to provide a clamp which may be quickly and easily brought into holding contact with the part with sufficient pressure to hold the part in proper position, and which may be quickly and easily retracted from its holding position.

Further objects will become apparent as the description of the clamp proceeds. For a better understanding of the invention, reference is made to the accompanying drawings in which:

Figure 1 is a front view of preferred form of clamp.

Figure 2 is a sectional view of a simple drill jig showing two clamps holding a workpiece.

The clamp, as shown in Figure 1 of the drawing, is constructed of a cylindrical body member 10 provided with an opening 11 extending axially throughout its length. The lower portion 12 of body 10 has a longitudinal slot 13 one wall of which is provided with a series of indentions 14 thus forming holding teeth and which is connected with opening 11. The upper portion 15 of body 10 is externally threaded and engaged with the threaded portion 15 are two lock-nuts 16 and 17. A bolt 18 is slidably positioned in opening 11 passing through body 10 and has projecting from its side a pin 19 passing through slot 13 and adapted to be engaged by teeth 14, upon rotation of bolt 18. A bolt head or knob 20 is attached to the upper end of bolt 18 and a helical spring 21 is disposed between head 20 and body 10 around bolt 18, resiliently urging bolt 18 and head 20 upwardly. A pressure foot 22 is resiliently and rotatably attached to the end of bolt 18 by means of a helical compression spring 23.

To install the clamp for use in a jig or fixture, as illustrated in Figure 2, holes 24 and 25 are drilled through the body of jig 26, at the points at which the workpiece 27 is to be held, and are threaded to receive the threaded upper portion 15 of body 10. The clamps A and B are then passed through holes 24 and 25 and threaded into them a sufficient amount to bring pressure foot 22 into such position that when bolt 18 is manually depressed, foot 22 is forced against workpiece 27 with sufficient pressure to compress spring 23 a desired amount to lock the workpiece in position. Lock-nut 16 is then brought into firm contact with the surface of jig 26 holding the clamp in proper position relative to workpiece 27. Lock-nut 17 is then screwed tightly against nut 16 to lock body 10 and prevent any change in position of the clamp while it is being used.

To operate the clamp, the operator presses down on knob 20 thus depressing bolt 18 and compressing spring 21 and forcing pressure foot 22 against workpiece 27 and then compressing spring 23 an amount sufficient to provide the desired holding pressure. Bolt 18 is then rotated to engage pin 19 in an indention 14 thereby locking the bolt in clamping position, as shown in Figure 2. During this rotation spring 23 rotates slightly with reference to pressure foot 22, so that the pressure foot does not rotate on the workpiece during the locking of bolt 18 so that the surface of the workpiece is not marred by the pressure foot. The position of pressure foot 22 of clamp A against the angular edge 28 of workpiece 27 illustrates the adaptability of the clamp to workpieces of irregular contour by the use of a resilient spring 23 with which contact button 22 is attached to bolt 18. Pressure foot 22 may have a smooth gripping surface or be made with its gripping surface 29 shaped to conform to projecting or recessed irregularities of a workpiece. To release the clamp, the operator rotates knob 20 slightly thus disengaging pin 19 from indention 14; spring 21 will then carry bolt 18 upwardly lifting pressure foot 22 clear of workpiece 27 and permitting easy removal of the latter from jig 26.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning

Having thus described my invention, what I claim as new and useful and desire to secure by Letters Patent is:

1. A device adapted to clamp a workpiece in a fixture having an aperture through a portion thereof comprising, in combination: a main body member slidable within said aperture and having an opening extending axially therethrough; said body member having a slot extending longitudinally thereof and terminating in said opening; one marginal wall of said slot being provided with a series of spaced apart holding teeth; means for securing said body member at any desired location in said aperture; a bolt extending through and slidable within the said opening, said bolt having a pin passing through said slot and adapted to engage any of said teeth; a pressure foot adapted to engage the workpiece; and a compression spring having one end connected to the end of said bolt adjacent to the workpiece and its other end connected to said pressure foot, said spring supporting the entire weight of said pressure foot, whereby movement of said bolt toward the workpiece causes said spring to advance the pressure foot against the workpiece and compress the spring and the rotation of the bolt causes said pin to engage one of said teeth and lock the bolt in workpiece-holding position.

2. A device for clamping a workpiece at a desired position in a fixture having an opening therethrough, comprising, in combination: a supporting member secured in said opening and having a cylindrical bore in alignment with the workpiece; a bolt slidable along said bore and having an operating knob at the end remote from the workpiece; a coil spring having one end secured to the end of said bolt adjacent the workpiece; a pressure foot secured to the other end of said spring, said coil spring supporting the entire weight of said pressure foot and having a length sufficient to permit unsymmetrical deformation of the spring in response to the advancement of the pressure foot against a workpiece face which is inclined at an acute angle to the longitudinal axis of the bolt; and means responsive to the rotation of said knob for locking the bolt at a desired position in said supporting member.

3. A clamping device as claimed in claim 2; in which said pressure foot is provided with a helically shaped projection adapted to frictionally engage the end convolutions of said spring.

4. A clamping device as claimed in claim 3; in which the end of said bolt adjacent the workpiece has a helical thread adapted for threaded engagement with a plurality of the end convolutions of said spring.

RAYMOND W. HARDY.

References Cited in the file of this patent

UNITED STATES PATENTS

| Number | Name | Date |
|---|---|---|
| 365,679 | Gantenberg | June 28, 1887 |
| 386,739 | Connelly | July 24, 1888 |
| 1,185,644 | Farrington | June 6, 1916 |